US008511758B2

(12) United States Patent
Sano et al.

(10) Patent No.: US 8,511,758 B2
(45) Date of Patent: Aug. 20, 2013

(54) BRAKE SYSTEM

(75) Inventors: Kazumoto Sano, Chuo (JP); Masaru Sakuma, Kai (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 215 days.

(21) Appl. No.: 12/870,114

(22) Filed: Aug. 27, 2010

(65) Prior Publication Data

US 2011/0049971 A1    Mar. 3, 2011

(30) Foreign Application Priority Data

Aug. 31, 2009 (JP) ................................ 2009-200975

(51) Int. Cl.
*B60T 8/44* (2006.01)

(52) U.S. Cl.
USPC ............. 303/114.1; 303/3; 303/6.01; 303/20; 303/52; 303/139; 303/155; 303/166; 60/538; 60/545; 60/582; 73/132; 73/865.2; 188/355; 188/358

(58) Field of Classification Search
USPC .................. 303/6.01, 114.1, 15, 113.3, 316, 303/113.4, 20; 188/316, 106 P; 60/545; 73/132, 865.2
IPC ........................................................ B60T 8/32
See application file for complete search history.

(56) References Cited

U.S. PATENT DOCUMENTS

| | | | | |
|---|---|---|---|---|
| 4,662,687 A | * | 5/1987 | Leiber | 303/113.3 |
| 2002/0158510 A1 | * | 10/2002 | Kobayashi et al. | 303/155 |
| 2008/0231109 A1 | * | 9/2008 | Yamada et al. | 303/20 |
| 2008/0258545 A1 | * | 10/2008 | Drumm | 303/114.1 |
| 2009/0115242 A1 | * | 5/2009 | Ohtani et al. | 303/3 |

FOREIGN PATENT DOCUMENTS

| | | | | |
|---|---|---|---|---|
| JP | 2000233733 A | * | 8/2000 | |
| JP | 2003252189 A | * | 9/2003 | |
| JP | 2008-239142 | | 10/2008 | |

* cited by examiner

*Primary Examiner* — Robert A Siconolfi
*Assistant Examiner* — San Aung
(74) *Attorney, Agent, or Firm* — Wenderoth, Lind & Ponack, LLP

(57) ABSTRACT

In a brake system, when setting a control origin position for a resolver for detecting a moved position of a booster piston, communication between a master cylinder and wheel cylinders is interrupted by cut valves. Thereafter, the booster piston is moved forward by an electric actuator in a direction in which a hydraulic pressure is generated so that a position detected by the resolver upon detection of generation of the hydraulic pressure by a hydraulic pressure sensor (position at a time of generation of hydraulic pressure) is obtained. A position obtained by moving backward the position at the time of generation of hydraulic pressure by a predetermined amount is set as the control origin position.

20 Claims, 6 Drawing Sheets

BRAKE SYSTEM

BACKGROUND OF THE INVENTION

The present invention relates to a brake system used for a vehicle.

The following brake apparatus (brake system) is described in JP 2008-239142 A. The brake apparatus includes: a master cylinder for generating a brake hydraulic pressure; an antilock brake system provided between the master cylinder and a wheel cylinder; and an electric booster including an input member moving forward and backward in response to an operation of a brake pedal and an assist member moving forward and backward by being driven by an electric actuator. The electric booster generates a boosted brake hydraulic pressure in the master cylinder under an input thrust applied to the input member from the brake pedal and an assist thrust applied to the assist member by the electric actuator. Then, the electric booster transmits a part of a reactive force generated by the brake hydraulic pressure to the input member and another part of the reactive force to the assist member.

In the brake apparatus described in JP 2008-239142 A, a control origin position for the assist member, and consequently the control origin position used by control means to perform control needs to be determined for the control at the time of system start-up or the like.

SUMMARY OF THE INVENTION

The present invention has an object to provide a brake system capable of setting a control origin position with high precision.

A brake system according to the present invention includes: a master cylinder for generating a brake hydraulic pressure by movement of a piston; a booster for moving the piston of the master cylinder; a hydraulic pressure detector for detecting the brake hydraulic pressure generated in the master cylinder; a valve mechanism provided so as to be capable of bringing the master cylinder and wheel cylinders into communication with each other and interrupting the communication between the master cylinder and the wheel cylinders; and a control device connected to the hydraulic pressure detector, for controlling the valve mechanism and the booster, in which: the booster includes: an input member moved forward and backward by an operation of a brake pedal; an assist member provided so as to be movable relative to the input member, the assist member being moved forward and backward by an electric actuator to move the piston of the master cylinder; and a moved position detector for detecting a moved position of the assist member; and when detecting a control origin position for the moved position detector, the control device interrupts the communication between the master cylinder and the wheel cylinders by the valve mechanism and then moves the assist member forward by the electric actuator in a direction in which a hydraulic pressure is generated, to thereby set, as the control origin position, a position obtained by moving backward by a predetermined amount a position at a time of generation of hydraulic pressure, which corresponds to a position detected by the moved position detector upon detection of the generation of the hydraulic pressure by the hydraulic pressure detector.

DETAILED DESCRIPTION OF THE INVENTION

First Embodiment

An electric brake system according to a first embodiment of the present invention is described based on FIGS. 1 to 4. The electric brake system according to the first embodiment is used for an automobile (not shown) which is an example of a vehicle.

Figure 1:
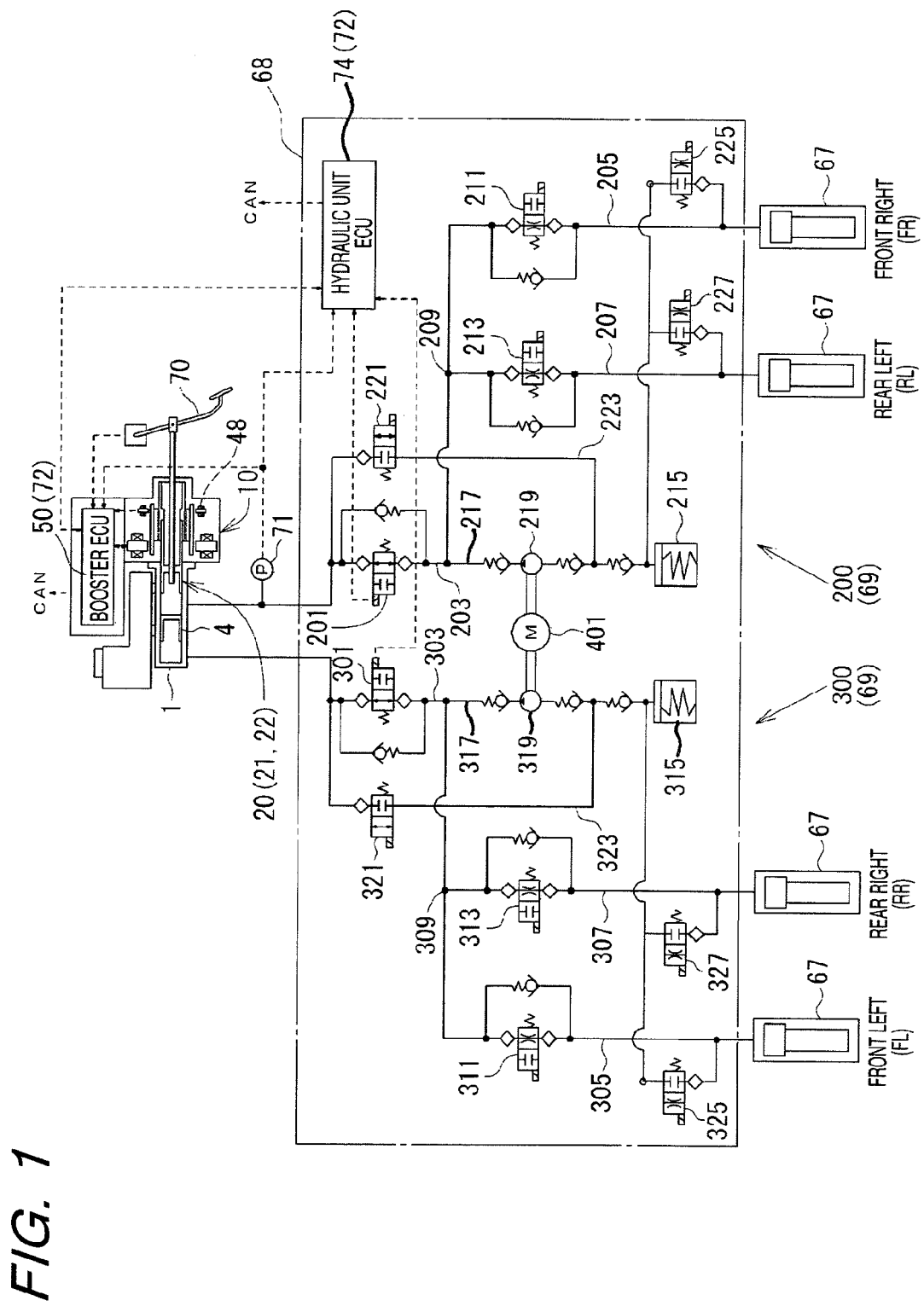
FIG. 1 is a system diagram illustrating a brake system according to a first embodiment of the present invention.
Figure 2:
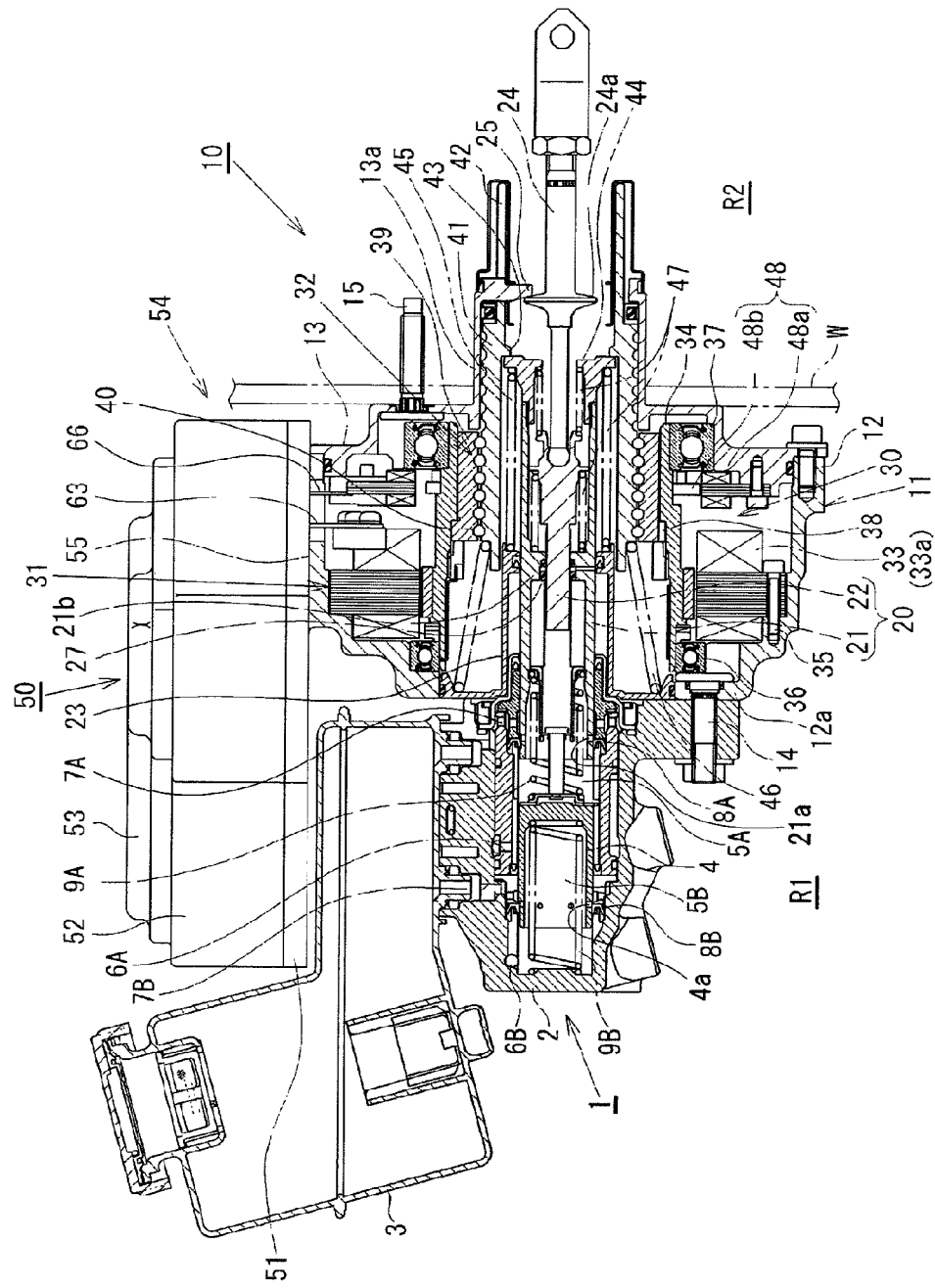
FIG. 2 is a sectional view illustrating a master cylinder and a booster illustrated in FIG. 1.

In FIGS. 1 and 2, the electric brake system mainly includes: a tandem maser cylinder (hereinafter, referred to as "master cylinder" as needed) 1; an electric booster 10; a hydraulic pressure sensor 71; normally-open cut valves 201 and 301; and a control device 72. The master cylinder 1 generates a brake hydraulic pressure by movement of a piston (booster piston 21 and piston assembly 20). The electric booster 10 serves as a booster for moving the piston (20 and 21) of the master cylinder 1. The hydraulic pressure sensor 71 corresponds to hydraulic pressure detection means for detecting the brake hydraulic pressure generated in the master cylinder 1. The cut valves 201 and 301 serve as a valve mechanism and are arranged so as to be capable of bringing the master cylinder 1 and wheel cylinders 67 into communication with each other and interrupting the communication therebetween. The control device 72 is connected to the hydraulic pressure sensor 71 and corresponds to control means for controlling the cut valves 201 and 301 and the electric booster 10. The control device 72 includes: a booster ECU 50; and a hydraulic unit ECU 74. The booster ECU 50 includes a control section (not shown) for controlling driving of an electric actuator 30 (and consequently for controlling the electric booster 10). The hydraulic unit ECU 74 controls a hydraulic unit 68 including the cut valves 201 and 301. By the cooperation of the booster ECU 50 and the hydraulic unit ECU 74, the control device 72 executes processing of setting a control origin position so as to set a control origin position for a resolver 48 corresponding to moved position detection means. The setting of the control origin position is described below referring to FIG. 3.

Each of the wheel cylinders 67 is constituted by a disc brake including a cylinder, a piston, and a pad (not shown). The wheel cylinders 67 are provided so as to correspond to four wheels (not shown) of the automobile (specifically, a front left wheel [also referred to as "FL wheel"], a front right wheel [also referred to as "FR wheel"], a rear left wheel [also referred to as "RL wheel"], and a rear right wheel [also referred to as "RR wheel"]). Hereinafter, the wheel cylinders 67 provided respectively corresponding to the four wheels are referred to as the wheel cylinder 67 for FL wheel, the wheel cylinder 67 for FR wheel, the wheel cylinder 67 for RL wheel, and the wheel cylinder 67 for RR wheel, as needed. Each of the wheel cylinders 67 is supplied with a brake fluid from the master cylinder 1 through an intermediation of the hydraulic unit 68 described below to thrust the piston so that the pad is pressed against a disc rotor rotating integrally with the corresponding wheel. In this manner, each of the wheel cylinders 67 exerts a braking force on the corresponding wheel.

As illustrated in FIG. 2, the electric booster 10 includes a casing 11. One end of the casing 11 is fixed to a partition W separating an engine room R1 and a cabin R2 from each other, whereas the other end of the casing 11 is connected to the tandem master cylinder 1 described below. Hereinafter, for convenience of the description, the engine room R1 side is referred to as the front side, whereas the cabin R2 side is referred to as the rear side. The casing 11 includes: a cylindrical casing main body 12; and a rear cover 13 bolted to a rear end of the casing main body 12. A stepped front wall 12a is provided to a front end of the casing main body 12 so as to be integral therewith. The tandem master cylinder 1 is fixedly fastened to the front wall 12a with a stud bolt 14. The rear cover 13 is fixedly fastened to the partition W with a stud bolt 15. A cylindrical guide portion 13a provided integrally with the rear cover 13 passes through the partition W so as to extend into the cabin R2 while the rear cover 13 is fixedly fastened as described above.

Inside the casing 11 constituting the electric booster 10, the piston assembly 20 and the electric actuator 30, both of which are described below, are provided. The piston assembly 20 is also used as a primary piston of the tandem master cylinder 1. The electric actuator 30 drives the booster piston (output piston) 21 constituting the piston assembly 20. On the other hand, the booster ECU 50 is provided integrally with an upper part of the casing 11 (casing main body 12).

The tandem master cylinder (hereinafter, referred to simply as "master cylinder") 1 includes a bottomed cylinder main body 2 and a reservoir 3. On the bottom side of the cylinder main body 2, a secondary piston 4 forming a pair with the piston assembly 20 corresponding to the primary piston is slidably provided. Inside the cylinder main body 2, two pressure chambers 5A and 5B are defined by the piston assembly 20 and the secondary piston 4. With the forward movement of the piston assembly 20 and the secondary piston 4, a brake fluid, which is sealed in the pressure chambers 5A and 5B, is pressure-fed from eject ports 6A and 6B provided to the cylinder main body 2 to the corresponding wheel cylinders 67 through the hydraulic unit 68 of an anti-lock brake system (ABS). The ABS is an example of a vehicle attitude control mechanism. The pressure chambers 5A and 5B are also referred to as the "primary chamber" 5A and the "secondary chamber" 5B, respectively, as needed.

Moreover, a relief port 7A for bringing the pressure chamber 5A into communication with the reservoir 3 and a relief port 7B for bringing the pressure chamber 5B into communication with the reservoir 3 are provided to the cylinder main body 2. Further, a pair of sealing members 8A and 8B are provided on an inner surface of the cylinder main body 2 so that so that the relief ports 7A and 7B are sandwiched between the sealing members 8A and 8B. Moreover, return springs 9A and 9B for constantly biasing backward the booster piston 21 of the piston assembly 20 corresponding to the primary piston and the secondary piston 4 are respectively provided in the pressure chambers 5A and 5B. A communication port 21a is provided to the booster piston 21 on the distal end side thereof, whereas a communication port 4a is provided to the secondary piston 4 on the distal end side thereof. The communication port 21a radially passes through the booster piston 21. In the same manner, the communication port 4a radially passes through the secondary piston 4. The pressure chamber 5A is brought into communication with the reservoir 3 through the communication port 21a and the relief port 7A when the piston assembly 20 is located in a position at the end of the backward movement thereof. As a result, a necessary amount of brake fluid is supplied from the reservoir 3 to the pressure chamber 5A. In the same manner, the pressure chamber 5B is brought into communication with the reservoir 3 through the communication port 4a and the relief port 7B when the secondary piston 4 is located in a position at the end of the backward movement thereof. As a result, a necessary amount of brake fluid is supplied from the reservoir 3 to the pressure chamber 5B. Specifically, when the position of the communication port 21a of the booster piston 21 is behind the sealing member 8A, the pressure chamber 5A and the reservoir 3 are brought into communication with each other to bring the pressure chamber 5A into an atmospheric condition. On the other hand, when the position of the communication port 21a of the booster piston 21 is ahead of the sealing member 8A, the communication between the pressure chamber 5A and the reservoir 3 is interrupted to bring the pressure chamber 5A into a state in which a hydraulic pressure is generated. Similarly, when the position of the communication port 4a of the secondary piston 4 is behind the sealing member 8B, the pressure chamber 5B and the reservoir 3 are brought into communication with each other to bring the pressure chamber 5B into an atmospheric condition. On the other hand, when the position of the communication port 4a of the secondary piston 4 is ahead of the sealing member 8B, the communication between the pressure chamber 5B and the reservoir 3 is interrupted to bring the pressure chamber 5B into a state in which the hydraulic pressure is generated.

The piston assembly 20 includes the booster piston 21 and an input piston 22. The solid input piston 22 is provided inside the cylindrical booster piston 21 so as to be movable relative to the booster piston 21.

The booster piston 21 is inserted through a cylindrical guide 23 so as to be slidable therein. The cylindrical guide 23 is fitted into a front end of the front wall 12a of the casing main body 12. A front end portion of the booster piston 21 extends into the pressure chamber (primary chamber) 5A of the master cylinder 1. On the other hand, the input piston 22 is slidably inserted through an annular wall portion 21b formed on an inner circumference of the booster piston 21. Similarly to the booster piston 21, a front end portion of the input piston 22 extends into the primary chamber 5A of the master cylinder 1. A space between the booster piston 21 and the cylinder main body 2 of the master cylinder 1 is sealed with the sealing member 8A, whereas a space between the booster piston 21 and the input piston 22 is sealed with a sealing member 27 provided to the annular wall portion 21b. In this manner, the brake fluid is prevented from leaking from the primary chamber 5A to an outside of the master cylinder 1.

On the other hand, a distal end portion of an input rod 24 corresponding to an input member which moves in tandem with a brake pedal 70 is turnably connected a rear end portion of the input piston 22. In this manner, the input piston 22 is moved forward and backward inside the booster piston 21 by an operation of the brake pedal 70 (pedal operation). In the middle of the input rod 24, a flange portion 24a having an enlarged diameter is integrally formed with the input rod 24. The flange portion 24a of the input rod 24 is caused to abut against an inward projection 25 formed integrally with a rear end of the cylindrical guide portion 13a of the rear cover 13 so that the backward movement (movement toward the cabin R2) of the input rod 24 is restricted. Specifically, the input piston 22 has the end of the backward movement thereof at the position at which the flange portion 24a of the input rod 24 abuts against the inward projection 25 of the rear cover 13. In this embodiment, the input piston 22 and the input rod 24 constitute the input member.

The electric actuator 30 includes: an electric motor 31; and a ball screw mechanism (mechanism for converting rotating movement into linear movement) 32 for converting the rotation of the electric motor 31 into linear movement to transmit the linear movement to the booster piston 21. In this embodiment, the booster piston 21 constitutes an assist member.

The electric motor 31 includes: a stator 33 including a plurality of coils 33a; and a hollow rotor 34 which is rotated by energizing the stator 33. The stator 33 is fixed to the casing main body 12 with a bolt 35, whereas the rotor 34 is turnably supported by the casing main body 12 and the rear cover 13 through an intermediation of bearings 36 and 37. The casing 11 is equivalent to a motor casing, and therefore is also referred to as the "motor casing" 11 as needed.

The ball screw mechanism 32 includes a nut member 39 and a hollow screw shaft (linearly moving member) 41. The nut member 39 is fitted and fixed to the rotor 34 of the electric motor 31 with a key 38 so as not to be able to rotate. The screw shaft 41 is meshed with the nut member 39 through balls 40. An axially extending slit 42 is formed in a rear end portion of the screw shaft 41. The inward projection 25 of the rear cover 13 is inserted into the slit 42. Specifically, the screw shaft 41 is provided inside the casing 11 so as not to be able to turn. In this manner, when the nut member 39 rotates integrally with the rotor 34, the screw shaft 41 linearly moves.

On the other hand, an annular projection 43 is provided on an inner surface of the screw shaft 41. A flange member 44 screwed to the rear end portion of the booster piston 21 abuts against the annular projection 43. A return spring (biasing means) 45 is provided between the flange member 44 and the cylindrical guide 23 fitted into the casing main body 12. With the return spring 45, the booster piston 21 constantly maintains a state in which the flange member 44 abuts against the annular projection 43 on the screw shaft 41 side. Therefore, when the screw shaft 41 moves forward with the rotation of the nut member 39, the booster piston 21 is pressed by the screw shaft 41 to be moved forward. In this embodiment, the screw shaft 41 is positioned at the end of backward movement thereof at which the beginning of the slit 42 abuts against the inward projection 25 on the rear cover 13 side when braking is not performed. According to the position of the screw shaft 41, the booster piston 21 is positioned at the end of backward movement thereof at which the flange portion 44 abuts against the annular projection 43 of the screw shaft 41 when the braking is not performed. A pressor bar spring 46 for biasing the screw shaft 41 backward so as to restrict the unexpected forward movement of the screw shaft 41 is provided between the screw shaft 41 and the cylindrical guide 23.

Moreover, a pair of balance springs (biasing means) 47 are provided between the booster piston 21 and the input piston 22 constituting the piston assembly 20. The pair of balance springs 47 serve to retain the booster piston 21 and the input piston 22 in neutral positions of the relative movement when the braking is not performed.

In this embodiment, a potentiometer (not shown) for detecting an absolute displacement of the input piston 22 relative to a vehicle body through an intermediation of the movement of the input rod 24 (or the brake pedal 70) is provided to a fixed portion inside the cabin R2. Moreover, the resolver (rotation sensor) 48 for detecting an absolute displacement of the booster piston 21 (rotational displacement of the electric motor 31, and consequently, moved position of the assist member) relative to the vehicle body based on the rotational displacement of the electric motor 31 is provided inside the casing 11. The resolver 48 includes: a resolver stator 48a bolted to the casing 11 (casing main body 12); and a resolver rotor 48B provided on an outer circumferential surface of the rotor 34 of the electric motor 31.

The control device 72 described below obtains a relative displacement amount between the input piston 22 and the booster piston 21 based on a detected signal of the potentiometer (absolute displacement of the input piston 22) and a detected signal of the resolver 48 (rotational displacement of the electric motor 31, and consequently, the moved position of the assist member). The control device 72 uses the obtained relative displacement amount (specifically, uses the detected signal of the resolver 48) to control the rotation of the rotor 34 of the electric motor 31 so as not to cause a relative displacement between the input piston 22 and the booster piston 21.

The booster ECU 50 includes an ECU casing 54 including: a box-like casing main body 52 having a base plate portion 51; and a lid body 53 for covering an upper opening of the casing main body 52. The control section described above is housed in the ECU casing 54. The ECU casing 54 is removably connected to the motor casing 11 while the base plate portion 51 is placed on a flat portion 55 provided to an upper part of the motor casing 11.

When the input rod 24, specifically, the input piston 22 of the electric booster 10 moves forward according to a pressing operation performed on the brake pedal 70, the movement is detected by the potentiometer. Then, in response to the signal from the potentiometer, the booster ECU 50 outputs a start command to the electric motor 31. As a result, the rotor 34 of the electric motor 31 rotates. The rotation is then converted into the linear movement by the ball screw mechanism 32 so as to be transmitted to the booster piston 21. Specifically, the input piston 22 and the booster piston 21 integrally move forward (are integrally thrust). As a result, brake hydraulic pressures according to an input thrust applied from the brake pedal 70 to the input piston 32 and a booster thrust applied from the electric motor 31 to the booster piston 21 are generated in the pressure chambers 5A and 5B in the master cylinder 10. At this time, when the rotation of the rotor 34 of the electric motor 31 is controlled so as not to cause the relative displacement between the input piston 22 and the booster piston 21, the pair of balance springs 47 provided between the input piston 22 and the booster piston 21 maintain the input piston 22 and the booster piston 21 in the neutral positions. A boost ratio at this time is uniquely determined by an area ratio of a pressure-receiving area of the booster piston 21 and a pressure-receiving area of the input piston 22 because the relative displacement amount between the input piston 22 and the booster piston 21 is zero.

On the other hand, when the booster piston 21 is relatively displaced by the booster thrust from the neutral position in a direction in which the brake hydraulic pressure is increased (forward), the boost ratio (braking force) is increased to realize a brake assist operation by the electric motor 31. At this time, a reactive force against the brake pedal 70 (pedal reactive force) is going to increase with an increase in brake hydraulic pressure. However, the biasing force of one of the pair of spring member 47, which is on the brake pedal 70 side (on the rear side), increases according to the above-mentioned relative forward displacement of the booster piston 21. Therefore, the amount of increase in pedal reactive force is cancelled by the biasing force. On the other hand, when the booster piston 21 is relatively displaced by the booster thrust from the neutral position in a direction in which the brake hydraulic pressure is reduced (backward), the boost ratio (braking force) is reduced to realize a regenerative cooperative operation for regenerative braking. At this time, the pedal reactive force is going to decrease with a reduction in brake hydraulic pressure. However, the biasing force of one of the pair of balance springs 47, which is on the forward side, increases according to the above-mentioned relative backward displacement of the booster piston 21. Therefore, the amount of reduction in pedal reactive force is cancelled by the biasing force. Specifically, as the result of adjustment of the reactive force against the brake pedal 70, uncomfortable feeling in the brake operation is not given.

The hydraulic unit 68 includes: a hydraulic unit main body 69 including two independent brake hydraulic systems 200 and 300; and the hydraulic unit ECU 74 for controlling the hydraulic unit main body 69 (brake hydraulic systems 200 and 300). The primary-side brake hydraulic system 200 feeds and ejects the brake fluid to/from the wheel cylinder 67 for FR wheel and the wheel cylinder 67 for RL wheel to control the braking forces for the FR wheel and the RL wheel. The secondary-side brake hydraulic system 300 feeds and ejects the brake fluid to/from the wheel cylinder 67 for FL wheel and the wheel cylinder 67 for RR wheel to control the braking forces for the FL wheel and the RR wheel. The primary-side brake hydraulic system 200 and the secondary-side brake hydraulic system 300 are provided to form an X-shaped circuit configuration. Therefore, even if a failure occurs in one of the systems, the other system can ensure the braking forces for a set of the two diagonally provided wheels.

Each of the primary-side brake hydraulic system 200 and the secondary-side hydraulic system 300 is configured in an equivalent form by using equivalent members. The equivalent members of the brake hydraulic systems 200 and 300 are denoted by three-digit numbers whose tens digits and ones digits are the same. However, a hundreds digit of each of the reference numerals of the members included in the primary-side brake hydraulic system 200 is "2", whereas that of each of the reference numerals of the members included in the secondary-side brake hydraulic system 300 is "3". Hereinafter, the primary-side brake hydraulic system 200 is representatively described for the description of the primary-side brake hydraulic system 200 and the secondary-side hydraulic system 300.

The primary-side brake hydraulic system 200 includes a brake fluid passage 203 (primary-side brake fluid passage 203) having a proximal end connected to the eject port 6A. The cut valve 201 (primary-side cut valve 201) is provided to a distal end portion (portion on the wheel cylinder 67 side) of the primary-side brake fluid passage 203.

The distal end portion of the primary-side brake fluid passage 203 with respect to the cut valve 201 branches into a first passage 205 (primary-side first passage 205) and a second passage 207 (primary-side second passage 207). A branch portion is referred to as a branch portion 209 between the first and second passages (primary-side branch portion 209 between the first and second passages) for convenience of the description.

The primary-side first passage 205 and the primary-side second passage 207 are respectively connected to the wheel cylinder 67 for FR wheel and the wheel cylinder 67 for RL wheel. In the middle of the primary-side first passage 205, a normally-open pressure increasing valve 211 (primary-side pressure increasing valve 211) is provided. In the same manner, a normally-open pressure increasing valve 213 (primary-side pressure increasing valve 213) is provided in the middle of the primary-side second passage 207.

A branch passage 217 (primary ABS reservoir-side branch passage 217) is provided, which branches from a portion of the brake fluid passage 203 between the branch portion 209 between the first and second passages, and the cut valve 201 to be connected to an ABS reservoir 215 (hereinafter, referred to as "primary ABS reservoir 215"). A pump 219 is provided in the middle of the primary ABS reservoir-side branch passage 217. The pump 219 is driven by a motor 401 shared by the secondary-side brake hydraulic system 300. A portion of the primary ABS reservoir-side branch passage 217, which is located between the pump 219 and the primary ABS reservoir 215, and a portion of the primary-side brake fluid passage 203 on the master cylinder 1 side with respect to the cut valve 201 (hereinafter, the master cylinder 1 side is referred to as "upstream" side), are brought into communication with each other by a passage 223. A normally-closed suction valve 221 is provided in the middle of the passage 223.

The wheel cylinder 67 for FR wheel is connected to the primary ABS reservoir 215 through a normally-closed pressure reducing valve 225, whereas the wheel cylinder 67 for RL wheel is connected to the primary ABS reservoir 215 through a normally-closed pressure reducing valve 227.

The cut valve 201, the pressure increasing valves 211 and 213, the suction valve 221, the pressure reducing valves 225 and 227, and the motor 401 are controlled by the hydraulic unit ECU 74.

The hydraulic unit ECU 74 is connected to the primary-side brake fluid passage 203 to control the cut valve 201 based on information detected by the hydraulic pressure sensor 71 corresponding to the hydraulic pressure detection means for detecting the hydraulic pressure of the primary pressure chamber 5A of the master cylinder 1, information from the booster ECU 50, and CAN information.

The control device 72 (booster ECU 50 and hydraulic unit ECU 74) uses the signal detected by the resolver 48 to control the rotation of the rotor 34 of the electric motor 31 as described above. In this manner, a desired braking force is generated. Then, for generating an appropriate braking force, a control origin position for the resolver 48 is set.

For detecting the control origin position for the resolver 48, the control device 72 interrupts the communication between the master cylinder 1 and the wheel cylinders 67 by the cut valves 201 and 301. Thereafter, with the electric motor 31, the control device 72 moves the booster piston 21 (assist member) forward in the direction in which the hydraulic pressure is generated. In response to input of a position detected by the resolver 48 when the generation of the hydraulic pressure is detected by the hydraulic pressure sensor 71 (hereinafter, the position is referred to as "position at the time of generation of the hydraulic pressure"), a position obtained by moving backward the position at the time of generation of the hydraulic pressure by a predetermined amount is set as the control origin position.

Figure 3:
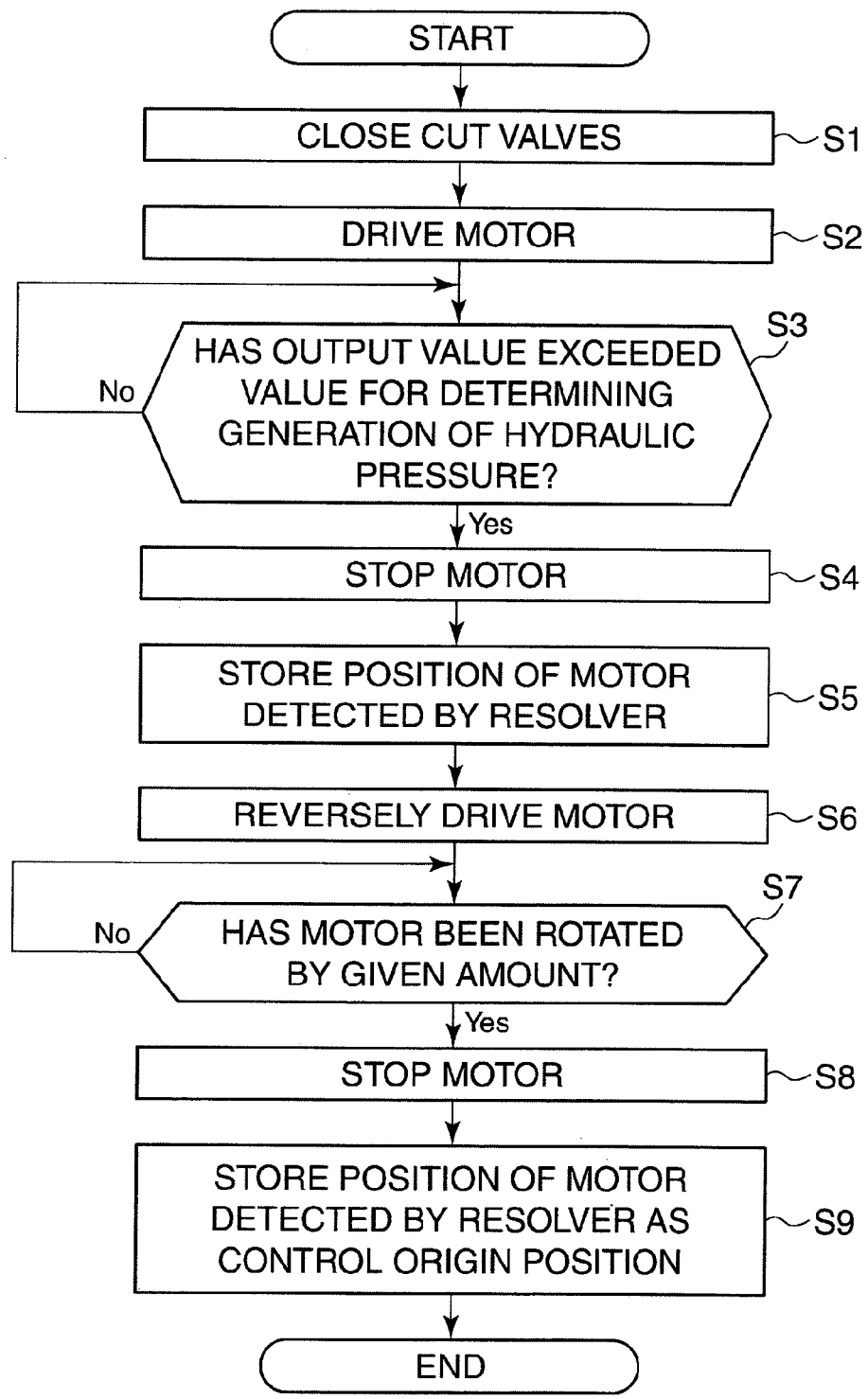
FIG. 3 is a flowchart illustrating the content of detection of a control origin position, the detection being performed by the brake system illustrated in FIG. 1.

Together with the content of setting of the control origin position, which is performed by the control device 72, the effects of the first embodiment are described below based on a flowchart of FIG. 3 and a time chart of FIG. 4.

In the first embodiment, the control device 72 (booster ECU 50 and hydraulic unit ECU 74) performs the setting of the control origin position for the resolver 48, for example, before the vehicle starts running at the time of engine start or before the brake operation is performed at the time of start of the vehicle. Then, for the setting of the control origin position for the resolver 48, in response to a command issued from the booster ECU 50 to the hydraulic unit ECU 74, the cut valves 201 and 301 are closed (Step S1). After or simultaneously with the closure of the cut valves 201 and 301, the booster ECU 50 activates the electric motor 31 (to perform the rotation in a direction in which the braking force is generated (forward direction) (hereinafter, the operation is referred to as "forward driving" as needed) to move the booster piston 21 forward (Step S2).

Figure 4:
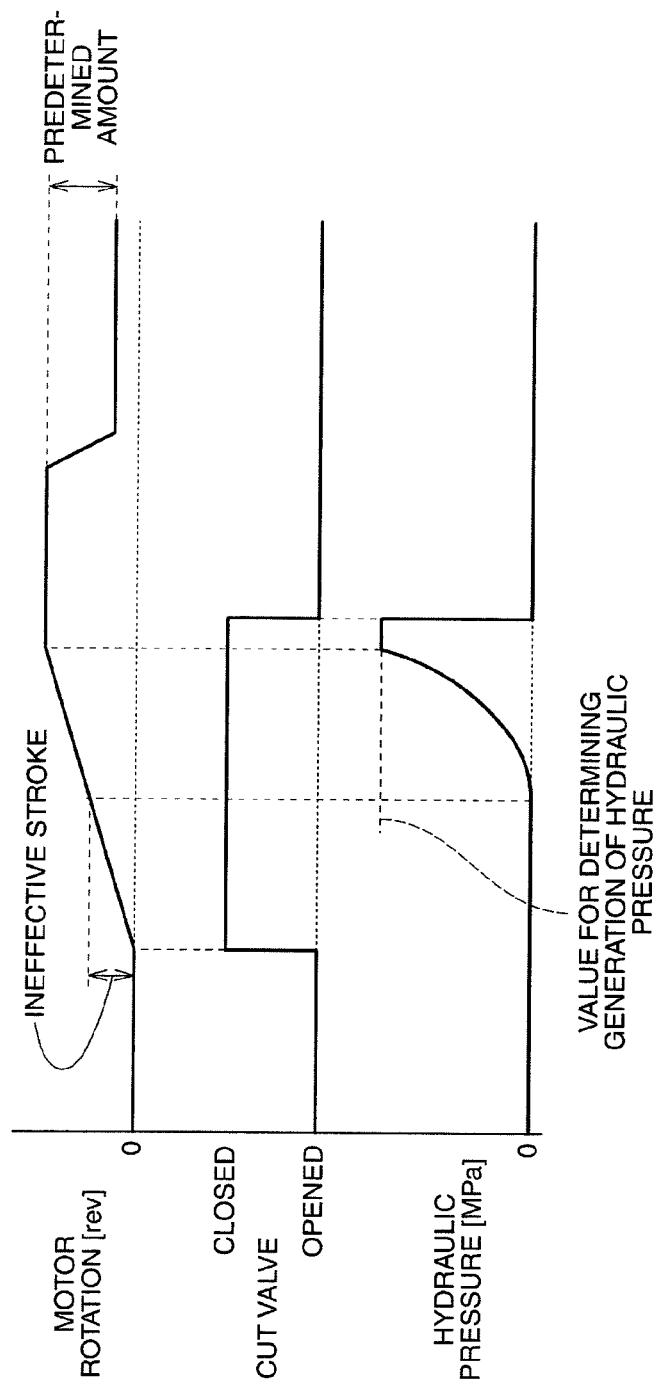
FIG. 4 is a time chart illustrating an operation for detecting the control origin position, the operation being performed by the brake system illustrated in FIG. 1.

With the rotation of the electric motor 31, as indicated in a part of FIG. 4, which shows the motor rotation, the booster piston 21 moves forward by the amount corresponding to an ineffective stroke of the master cylinder 1 to close the communication port 21a of the booster piston 21 with the sealing member 8A. Thereafter, as indicated in a part of FIG. 4, which shows the hydraulic pressure, the brake hydraulic pressure in the master cylinder 1 starts increasing. The ineffective stroke corresponds to a travel distance of the booster piston 21 from the position at which the booster piston 21 is not in operation to the position at which the communication between the pressure chamber 5A and the reservoir 3 and the communication between the pressure chamber 5B and the reservoir 3 are interrupted by the movement of the piston assembly 20 and the secondary piston 4, the movement being caused with the movement of the booster piston 21, specifically, from the start of the movement of the piston assembly 20 and the secondary piston 4 until the communication port 21a of the booster piston 21 and the communication port 4a of the secondary piston 4 reach the positions at which the communication port 21a and the communication port 4a are respectively closed by the sealing members 8A and 8B (hereinafter, referred to as sealing positions).

Subsequent to Step S2, the control device 72 compares an output value of the hydraulic pressure sensor 71 and a value for determining the generation of the hydraulic pressure illustrated in FIG. 4, which is previously set in the control device 72. The value for determining the generation of the hydraulic pressure is set to, for example, 0.05 MPa in the embodiment. By the above-mentioned comparison, the control device 72 determines whether or not the output value of the hydraulic pressure sensor 71 has exceeded the value for determining the generation of the hydraulic pressure (Step S3). When it is determined in Step S3 that the output value of the hydraulic pressure sensor 71 has exceeded the value for determining the generation of the hydraulic pressure (specifically, it is determined as Yes in Step S3), the control device 72 determines that the generation of the hydraulic pressure has been detected by the hydraulic pressure sensor 71. Therefore, the control device 72 stops the operation of the electric actuator 30 (Step S4). In addition, the position (position at the time of generation of the hydraulic pressure) detected by the resolver 48 at this time (at the time of generation of the hydraulic pressure) is stored in a memory (not shown) (Step S5).

When it is determined as No in Step S3, Step S3 is performed again. The value for determining the generation of the hydraulic pressure is not limited to 0.05 MPa described above, but may be any value as long as the value is a hydraulic pressure value which can be detected by the hydraulic pressure sensor 71. Preferably, the value for determining the generation of the hydraulic pressure is set to the lowest output value (hydraulic pressure value) which can be detected by the hydraulic pressure sensor 71 or to a value higher than the lowest output value in the vicinity thereof. In this manner, a time period required for the detection of the generation of the hydraulic pressure can be reduced.

Subsequent to Step S5, the control device 72 (booster ECU 50) reversely drives the electric motor 31 by the control for the electric actuator 30 (Step S6). Then, the control device 72 (booster ECU 50) determines whether or not the electric motor 31 has been rotated by a given amount, and consequently whether or not the booster piston 21 has been moved backward by a predetermined amount $\Delta X$, by the reverse driving of the electric motor 31 (Step S7). Here, the predetermined amount $\Delta X$ corresponds to the amount of movement of the booster piston 21, which is required for moving the booster piston 21 backward from the position at which the output value of the hydraulic pressure sensor 71 reaches the value for determining the generation of the hydraulic pressure (position at the time of generation of the hydraulic pressure) to achieve a state in which the pressure chambers 5A and 5B and the reservoir 3 are brought into communication with each other. Therefore, the predetermined amount $\Delta X$ is set as a value obtained by adding a first movement amount of the booster piston 21 from the sealing position to the position at the time of generation of the hydraulic pressure and a second movement amount of the booster piston 21 from the sealing position, which is required for bringing the pressure chambers 5A and 5B and the reservoir 3 into communication with each other by the piston assembly 20 and the secondary piston 4. The first movement amount is obtained based on the relation between the brake hydraulic pressure generated in the pressure chamber 5A of the master cylinder 1 and the amount of a stroke of the booster piston 21 (hydraulic pressure-stroke characteristic). Moreover, as the second movement amount increases, the ineffective stroke amount also increases. Therefore, it is desired the second movement amount be set to a value as small as possible as long as the value allows the maintenance of the state in which the pressure chambers 5A and 5B and the reservoir 3 are constantly in communication with each other at non-operating time.

In this embodiment, the first movement amount obtained at the time when the hydraulic pressure value becomes equal to 0.05 MPa corresponding to the value for determining the generation of the hydraulic pressure in this embodiment is 0.2 mm. Therefore, when the second movement amount is set to 1.2 mm, the predetermined amount $\Delta X$ is 1.4 mm.

The predetermined amount $\Delta X$, the first movement amount, and the second movement amount described above are not limited to the above-mentioned values, and may be set to any values as long as the pressure chambers 5A and 5B and the reservoir 3 are constantly in communication by the piston assembly 20 and the secondary piston 4 at non-operating time. The setting of the predetermined amount $\Delta X$, the first movement amount, and the second movement amount described above can be achieved by positioning the communication ports 21a and 4a within the range allowable as the ineffective stroke (preferably, in the range of from 0.6 mm to 2.0 mm back away from each of the sealing positions) according to dimensions of the portions of the master cylinder 1.

When the control device 72 (booster ECU 50) determines that the electric motor 31 has been rotated by a given amount, and consequently the booster piston 21 has been moved backward by the predetermined amount $\Delta X$, specifically, it is determined as Yes in Step S7, the control device 72 stops the electric motor 31 (Step S8).

Then, the control device 72 (booster ECU 50) sets the value detected by the resolver 48 (value corresponds to the position of the booster piston 21, which is obtained by moving the booster piston 21 backward by the predetermined amount $\Delta X$ from the position at the time of generation of the hydraulic pressure) when the electric motor 31 is stopped in Step S8 as the control origin position. In addition, the control device 72 stores the control origin position in the memory (not shown) (Step S9). In the above-mentioned manner, the processing of setting the control origin position is terminated.

The processing of setting the control origin position described above is immediately interrupted to achieve a normal brake control standby state when a pressing operation performed by a driver for the brake pedal 70 is detected by a stroke sensor (not shown) for detecting the stroke of the input rod 24 of the electric booster 10, a switch (not shown) provided in the periphery of the brake pedal 70, or the like.

When brake control for inter-vehicle distance automatic control or the like is required, the above-mentioned processing of setting the control origin position is interrupted because the control device 72 cooperates with another control equipment for the brake control.

In the above-mentioned processing of setting the control origin position, the control is performed to stop the electric actuator 30 (Steps S4 and S8) when it is determined that the hydraulic pressure has exceeded the value for determining the generation of the hydraulic pressure (Step S3) or when it is determined that the electric motor 31 has been rotated by the given amount by reversely driving the electric motor 31 (Step S7). In some cases, the electric actuator 30 is not immediately stopped due to a mechanical delay. In such a case, the amount of rotation from the start of the stop control to the completion of the stop of the electric motor 31 is measured according to the driving direction. The rotation by the given amount, which is caused by the reverse driving, is set in consideration of the measured value. In this manner, the precision of the setting of the control origin position is improved.

Moreover, in the above-mentioned processing of setting the control origin position, the electric motor 31 is reversely driven to move the booster piston 21 backward by the predetermined amount ΔX after the position at the time of generation of the hydraulic pressure is stored. However, the predetermined amount ΔX, which is previously set, may be subtracted from the stored position at the time of generation of the hydraulic pressure to set the control origin position without actually moving the booster piston 21.

According to this embodiment, for detecting the control origin position for the resolver 48, after the communication between the master cylinder 1 and the wheel cylinders 67 is interrupted by the cut valves 201 and 301 (valve mechanism), the booster piston 21 (assist member) is moved forward by the electric actuator 30 in the direction in which the hydraulic pressure is generated. Then, the position obtained by moving backward by the predetermined amount ΔX the position (position at the time of generation of the hydraulic pressure), which is detected by the resolver 48 (moved position detection means) upon detection of the generation of the hydraulic pressure by the hydraulic pressure sensor 71 (hydraulic pressure detection means), is set as the control origin position. Therefore, the control origin position can be set with high precision. By performing the control using the control origin position set with high precision as described above, drag and a response delay, which may occur in the case where the control origin position is not appropriately set, can be prevented from occurring. As a result, the durability of the system can be improved. Further, the operation feeling of the driver when he/she performs the braking operation can be improved.

In this embodiment, the processing of setting the control origin position for the resolver 48 is performed before the vehicle starts running at the time of engine start or before the brake operation is performed at the time of start of the vehicle. More specifically, the processing of setting the control origin position is performed when, for example, an ignition switch is turned ON, simultaneously with processing of confirming the start-up of the vehicle attitude control mechanism (not shown) (processing is performed when a vehicle speed reaches about 5 Km/h after the vehicle starts running) used for the automobile for which the electric brake system of this embodiment is used, or at the timing at which the braking is not performed at the time of start of the vehicle. Besides, the processing of setting the control origin position for the resolver 48 can be performed by using unlock (door unlock) or door opening before the engine start, or an operation of an accelerator performed by the driver after the engine start, as a trigger.

In the electric booster 10 of this embodiment, the electric motor 31 can be controlled to move the booster piston 21 (assist member) from the position at which the booster piston 21 is not in operation to the position at the time of generation of the hydraulic pressure, which is stored in Step S5, based on input of a braking prediction signal in response to a change in status of the accelerator from ON to OFF while the brake pedal 70 is not operated. As described above, it is after the status of the accelerator is changed from ON to OFF that the brake pedal 70 is operated while the vehicle is running. Therefore, the booster piston 21 is moved forward in advance to the position at the time of generation of the hydraulic pressure, predicting that the braking force is required later. In this manner, upon operation of the brake pedal 70, the hydraulic pressure can be immediately generated in each of the pressure chambers 5A and 5B of the master cylinder 1. As a result, the response of the electric booster 10 is improved.

Second Embodiment

In the first embodiment described above, the case where the electric booster 10 is used as a booster is described as an example. Instead, a booster (hereinafter, referred to as "control-type booster") 511 including a solenoid mechanism 509 which includes a solenoid 507 capable of operating power pistons 503 and 505 (assist members) of a pneumatic booster 501 may be used. An example (second embodiment) thereof is described based on FIGS. 5 and 6.

Figure 5:
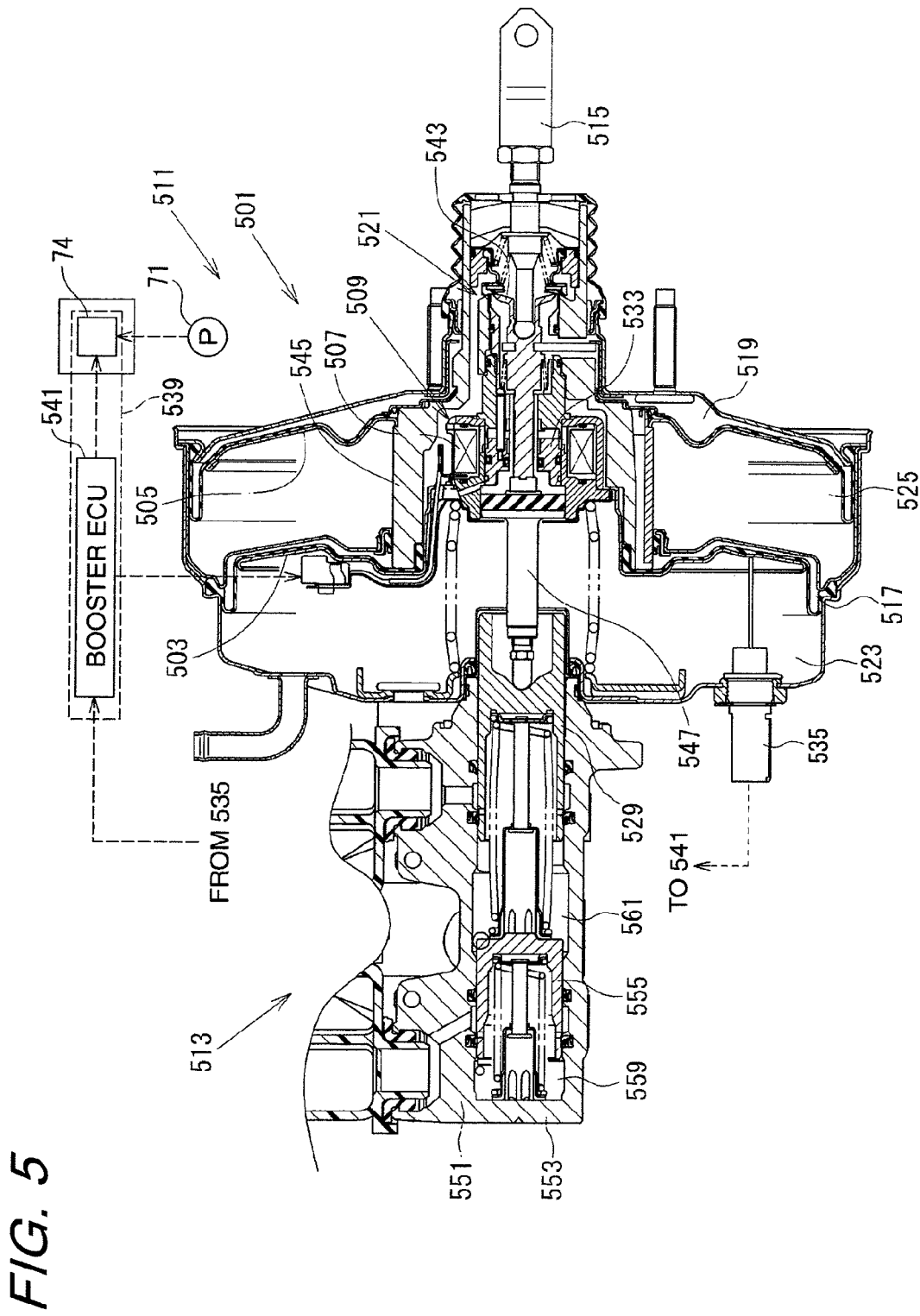
FIG. 5 is a sectional view illustrating a brake system according to a second embodiment of the present invention.

A brake system according to the second embodiment includes: the control-type booster 511 illustrated in FIG. 5; a tandem master cylinder (hereinafter, referred to simply as "master cylinder") 513 illustrated in FIG. 5; the hydraulic unit 68 illustrated in FIG. 1; and the hydraulic pressure sensor 71 illustrated in FIG. 1, which corresponds to the hydraulic pressure detection means.

The pneumatic booster 501, and consequently the control-type booster 511 include a valve mechanism 521 for controlling the supply of a working fluid to variable-pressure chambers 517 and 519 by an input rod 515 which operates in tandem with the brake pedal 70. The control-type booster 511 transmits thrusts generated from the power pistons 503 and 505 by a difference in pressure, which is generated between the variable-pressure chambers 517 and 519 and constant-pressure chambers 523 and 525 based on the operation of the valve mechanism 521, to a primary piston 529 of the master cylinder 513. The control-type booster 511 further includes: the solenoid mechanism 509 including a movable element 533 for driving the valve mechanism 521 independently of the operation of the input rod 515; a stroke sensor 535 for detecting the positions of the power pistons 503 and 505; and a booster ECU 541 constituting a control device 539 with the hydraulic unit ECU 74, the booster ECU 541 being for controlling the solenoid 507 and the hydraulic unit ECU 74.

In the second embodiment, the solenoid mechanism 509 (consequently, solenoid 507) constitutes the electric actuator.

In the control-type booster 511, an electromagnetic force is exerted on the movable element 533 by supplying a current to the solenoid 507. When the electromagnetic force exerted on the movable element 533 becomes equal to or larger than a predetermined value, a breather valve 543 of the valve mechanism 521 is opened to introduce the atmosphere into the variable-pressure chambers 517 and 519. As a result, the difference in pressure is generated between the variable-pressure chambers 517 and 519 and the constant-pressure chambers 523 and 525. In this manner, the power pistons 503 and 505 are thrust. The thrusts of the power pistons 503 and 505 are transmitted to an output rod 547, and consequently to the primary piston 529 of the master cylinder 513 through an intermediation of a valve body 545.

The master cylinder 513 includes: the primary piston 529 receiving the transmission of the force from the output rod 547 of the control-type booster 511; and a secondary piston 555 provided on the side on which a bottom portion 553 of a cylinder body 551 is located. Generally, a secondary hydraulic chamber 559 for supplying the hydraulic pressure to a secondary-side brake fluid passage 303 of the hydraulic unit 68 is formed between the bottom portion 553 and the secondary piston 555 inside the cylinder body 551, whereas a primary hydraulic chamber 561 for supplying the hydraulic pressure to a primary-side brake fluid passage 203 of the hydraulic unit 68 is formed between the secondary piston 555 and the primary piston 529 inside the cylinder body 551.

Figure 6:
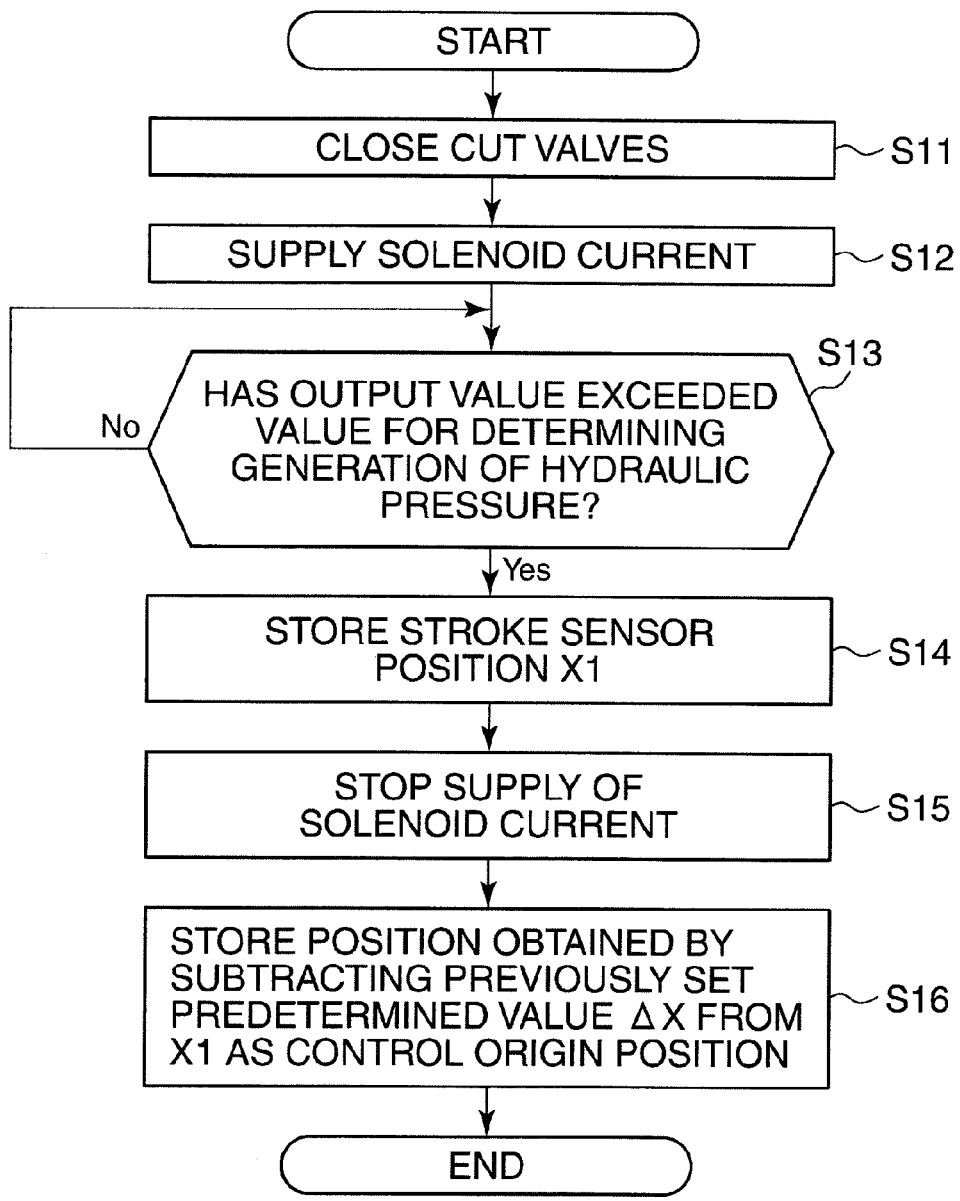
FIG. 6 is a flowchart illustrating the content of detection of the control origin position, the detection being performed by the brake system illustrated in FIG. 5.

In the second embodiment, as illustrated in FIG. 6, when the control origin position of the stroke sensor 535 is set, the cut valves 201 and 301 are closed by a command issued from the booster ECU 541 to the hydraulic unit ECU 74 (Step S11). After or simultaneously with the closure of the cut valves 201 and 301, a current (solenoid current) is supplied to the solenoid 507 by a command from the booster ECU 541 to move the power pistons 503 and 505, and consequently the primary piston 529 forward (to the left of FIG. 5) (Step S12).

After the primary piston 529 is moved forward by the amount corresponding to an ineffective stroke of the master cylinder 513, the brake hydraulic pressure in the master cylinder 513 starts increasing (see FIG. 4).

Subsequent to Step S12, the control device 539 compares the output value of the hydraulic pressure sensor 71 and the value for determining the generation of the hydraulic pressure illustrated in FIG. 4, which is previously set in the control device 539, with each other to determine whether or not the output value of the hydraulic pressure sensor 71 has exceeded the value for determining the generation of the hydraulic pressure (Step S13).

When it is determined as No in Step S13, Step S13 is performed again.

When it is determined in Step S13 that the output value of the hydraulic pressure sensor 71 has exceeded the value for determining the generation of the hydraulic pressure (specifically, it is determined as Yes in Step S13), the control device 539 determines that the hydraulic pressure has been generated. Therefore, in this step, the position detected by the stroke sensor 535 is stored as a stroke sensor position X1 (corresponding to the position at the time of generation of the hydraulic pressure) in the memory (not shown) (Step S14). In addition, the supply of the current to the solenoid 507 is stopped (Step S15). With the stop of the supply of the current to the solenoid 507 in Step S15, the spring members (reference numerals thereof are omitted) function to move the power pistons 503 and 505 backward (to the right of FIG. 5).

Subsequent to Step S15, the control device 539 (booster ECU 541) sets, as the control origin position, a value obtained by subtracting the predetermined value (predetermined amount) ΔX, which is previously set, from the stroke sensor position X1 (corresponding to the position at the time of generation of the hydraulic pressure) stored in Step S14. In addition, the control device 539 stores the control origin position in the memory (not shown) (Step S16). In the above-mentioned manner, the processing of setting the control origin position is terminated. The predetermined value (predetermined amount) ΔX is the amount of movement obtained in the same manner as that for the predetermined amount ΔX described in the first embodiment.

According to the second embodiment, for detecting the control origin position for the stroke sensor 535, the communication between the master cylinder 513 and the wheel cylinders 67 is interrupted by the cut valves 201 and 301. Thereafter, the power pistons 503 and 505 (assist members), and consequently the primary piston 529 are moved forward by the solenoid 507 (solenoid mechanism 509) in the direction in which the hydraulic pressure is generated. Then, the position obtained by moving backward by the predetermined value ΔX the position (position at the time of generation of the hydraulic pressure) detected by the stroke sensor 535 (moved position detection means) upon detection of the generation of the hydraulic pressure by the hydraulic pressure sensor 71 (hydraulic pressure detection means) is set as the control origin position. Thus, the control origin position can be set with high precision. By performing the control using the thus set control origin position with high precision, the drag and the response delay, which may occur when the control origin position is not appropriately set, can be prevented from occurring. As a result, the durability of the brake system can be improved. In addition, the operation feeling of the driver when he/she performs the braking operation can be improved.

In the present invention, the assist member may be any member as long as the assist member is movable relative to the input member and is moved forward and backward by the electric actuator to move the pistons of the master cylinder. Specifically, the assist member may be the booster piston 21 which is directly moved forward and backward by driving the electric motor 31 corresponding to the electric actuator as in the first embodiment or the power pistons 503 and 505 which are indirectly moved forward and backward by driving the solenoid mechanism 509 corresponding to the electric actuator to switch the opening/closure of the valve mechanism 521. Besides, the assist member of the present invention may be an assist member which is a separate member from the pistons of the master cylinder and is directly moved forward and backward by the solenoid mechanism corresponding to the electric actuator to move the pistons of the master cylinder. In this case, the assist member (booster piston) does not need to be extended in one of the pressure chambers of the master cylinder, as in the first embodiment.

According to the invention relating to the brake system of the embodiments described above, the control origin position can be set with high precision.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2009-200975 filed on Aug. 31, 2009. The entire disclosure of Japanese Patent Application No. 2009-200975 filed on Aug. 31, 2009 including specification, claims, drawings and summary is incorporated herein by reference in its entirety.

What is claimed is:
1. A brake system, comprising:
a master cylinder for generating a brake hydraulic pressure by movement of a piston;
a booster for moving the piston of the master cylinder;
a hydraulic pressure detector for detecting the brake hydraulic pressure generated in the master cylinder;

a valve mechanism provided so as to be capable of bringing the master cylinder and wheel cylinders into communication with each other and interrupting the communication between the master cylinder and the wheel cylinders; and a control device connected to the hydraulic pressure detector, for controlling the valve mechanism and the booster, wherein:

the booster includes:
an input member moved forward and backward by an operation of a brake pedal;
an assist member provided so as to be movable relative to the input member, the assist member being moved forward and backward by an electric actuator to move the piston of the master cylinder; and
a moved position detector for detecting a moved position of the assist member; and when detecting a control origin position for the moved position detector, the control device interrupts the communication between the master cylinder and the wheel cylinders by the valve mechanism and then moves the assist member forward by the electric actuator in a direction in which a hydraulic pressure is generated, to thereby set, as the control origin position, a position obtained by moving backward by a predetermined amount a position at a time of generation of hydraulic pressure, the position at a time of generation of hydraulic pressure being detected by the moved position detector upon detection of the generation of the hydraulic pressure by the hydraulic pressure detector.

2. A brake system according to claim 1, wherein the position obtained by moving the position at the time of generation of hydraulic pressure backward by the predetermined amount is within an allowable range of an ineffective stroke of the master cylinder.

3. A brake system according to claim 1, wherein the control device stops the detection of the control origin position when the brake pedal is operated.

4. A brake system according to claim 1, wherein the control device moves the assist member based on input of a braking prediction signal to the position detected by the moved position detector upon the detection of the generation of the hydraulic pressure by the hydraulic pressure detector.

5. A brake system according to claim 1, wherein:
the electric actuator includes a rotary motor; and
the moved position detector is a resolver for detecting an angle of rotation of a rotor provided to the rotary motor.

6. A brake system according to claim 1, wherein:
the booster includes a pneumatic booster;
the electric actuator includes a solenoid capable of operating a power piston of the pneumatic booster; and
the moved position detector is a stroke sensor for detecting a position of the power piston.

7. A brake system according to claim 1, wherein the valve mechanism includes a valve provided to a vehicle attitude control mechanism for controlling an attitude of a vehicle.

8. A brake system according to claim 7, wherein the detection of the control origin position by the moved position detector is performed when processing of confirming start-up of the vehicle attitude control mechanism is performed.

9. A brake system according to claim 1, wherein the detection of the control origin position by the moved position detector is performed when an ignition switch of a vehicle is turned ON.

10. A brake system according to claim 1, wherein the generation of the hydraulic pressure by the hydraulic pressure detector is detected based on an output value which becomes equal to one of a lowest hydraulic pressure value detectable by the hydraulic pressure detector and a value higher than the lowest hydraulic pressure value in vicinity of the lowest hydraulic pressure value.

11. A brake system according to claim 1, wherein:
the master cylinder includes a pressure chamber for generating the brake hydraulic pressure and a reservoir for supplying a brake fluid to the pressure chamber; and
the predetermined amount of the backward movement from the position at the time of generation of hydraulic pressure corresponds to a movement amount of the piston from the position at the time of generation of hydraulic pressure to a position which allows the pressure chamber and the reservoir to be brought into communication with each other.

12. A brake system, comprising:
a master cylinder for generating a brake hydraulic pressure in a pressure chamber cut off from a reservoir by movement of a piston;
a booster for moving the piston of the master cylinder by an assist member moved forward and backward by an electric actuator, the booster including a moved position detector for detecting a moved position of the assist member;
a hydraulic pressure detector for detecting the brake hydraulic pressure generated in the master cylinder;
a valve mechanism provided so as to be capable of bringing the master cylinder and wheel cylinders into communication with each other and interrupting the communication between the master cylinder and the wheel cylinders; and
a control device connected to the hydraulic pressure detector, for controlling the valve mechanism and the booster, wherein:
the control device includes:
a master cylinder cut-off control unit for interrupting the communication between the master cylinder and the wheel cylinders by the valve mechanism, when detecting a control origin position for the moved position detector;
an assist member forward movement control unit for moving the assist member forward by the electric actuator in a direction in which a hydraulic pressure is generated after the communication between the master cylinder and the wheel cylinders is interrupted by the master cylinder cut-off control unit;
a hydraulic pressure generation detection unit for detecting generation of the hydraulic pressure by the hydraulic pressure detector when the assist member is moved forward by the assist member forward movement control unit in the direction in which the hydraulic pressure is generated;
a storing unit for storing a position at a time of generation of hydraulic pressure, the position being detected by the moved position detector, upon detection of the generation of the hydraulic pressure by the hydraulic pressure generation detection unit; and
a control origin position setting unit for setting, as the control origin position, a position obtained by moving backward by a predetermined amount the position at the time of generation of hydraulic pressure, which is stored by the storing unit.

13. A brake system according to claim 12, wherein the hydraulic pressure detector detects the generation of the hydraulic pressure based on a predetermined output value which is higher than a lowest hydraulic pressure value detectable by the hydraulic pressure detector.

14. A brake system according to claim 12, wherein the predetermined amount of the backward movement from the position at the time of generation of hydraulic pressure is a movement amount of the piston from the position at the time of generation of hydraulic pressure to a position allowing the pressure chamber and the reservoir to be brought into communication with each other.

15. A brake system according to claim 12, wherein:
the electric actuator includes a rotary motor; and
the moved position detector is a resolver for detecting an angle of rotation of a rotor provided to the rotary motor.

16. A brake system, comprising:
a booster for moving a piston of a master cylinder by an assist member moved forward and backward by an electric actuator, the booster including a moved position detector for detecting a moved position of the assist member, the master cylinder being provided for generating a brake hydraulic pressure in a pressure chamber cut off from a reservoir;
a hydraulic pressure detector for detecting the brake hydraulic pressure generated in the master cylinder;
a valve mechanism provided so as to be capable of bringing the master cylinder and wheel cylinders into communication with each other and interrupting the communication between the master cylinder and the wheel cylinders; and
a control device connected to the hydraulic pressure detector, for controlling the valve mechanism and the booster, wherein:
when detecting a control origin position for the moved position detector, the control device interrupts the communication between the master cylinder and the wheel cylinders by the valve mechanism and then moves the assist member forward in a direction in which a hydraulic pressure is generated, to thereby set, as the control origin position, a position obtained by moving the assist member backward by a predetermined amount from a position of the assist member at a time of generation of hydraulic pressure upon detection of generation of the hydraulic pressure.

17. A brake system according to claim 16, wherein the generation of the hydraulic pressure is detected based on a predetermined output value which is higher than a lowest hydraulic pressure value detectable by the hydraulic pressure detector.

18. A brake system according to claim 16, wherein the predetermined amount of the backward movement from the position at the time of generation of hydraulic pressure is a movement amount of the piston from the position at the time of generation of hydraulic pressure to a position allowing the pressure chamber and the reservoir to be brought into communication with each other.

19. A brake system according to claim 16, wherein:
the electric actuator includes a rotary motor; and
the moved position detector is a resolver for detecting an angle of rotation of a rotor provided to the rotary motor.

20. A brake system according to claim 1, wherein the hydraulic pressure detector detects the generation of the hydraulic pressure based on a predetermined output value which is higher than a lowest hydraulic pressure value detectable by the hydraulic pressure detector.

* * * * *